June 8, 1954  J. M. MURPHY  2,680,339
DISK TYPE LAWN MOWER WITH WHEEL ADJUSTMENT
Filed Dec. 27, 1950
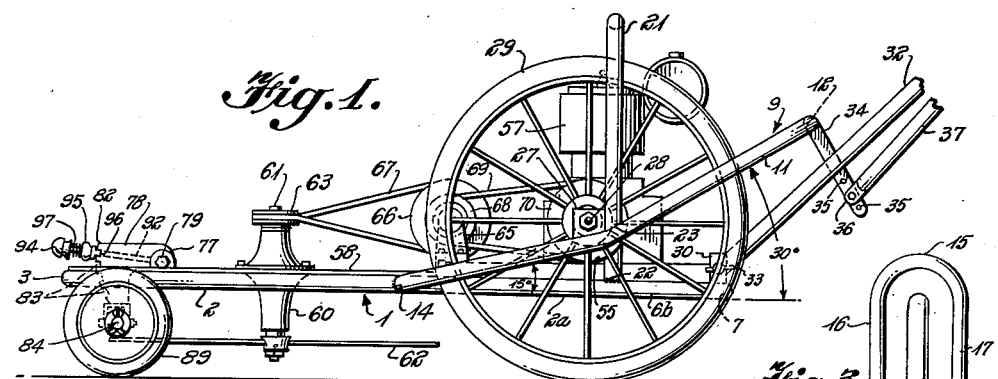
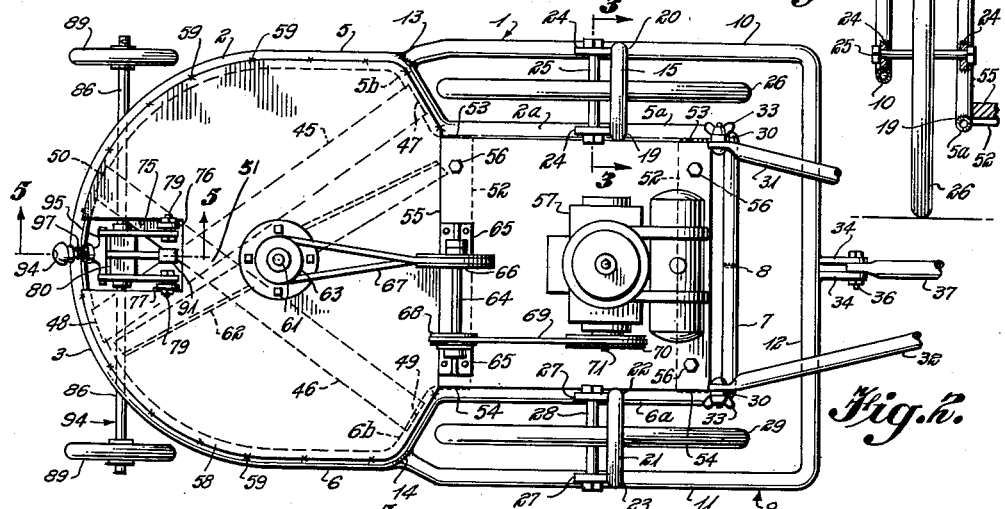
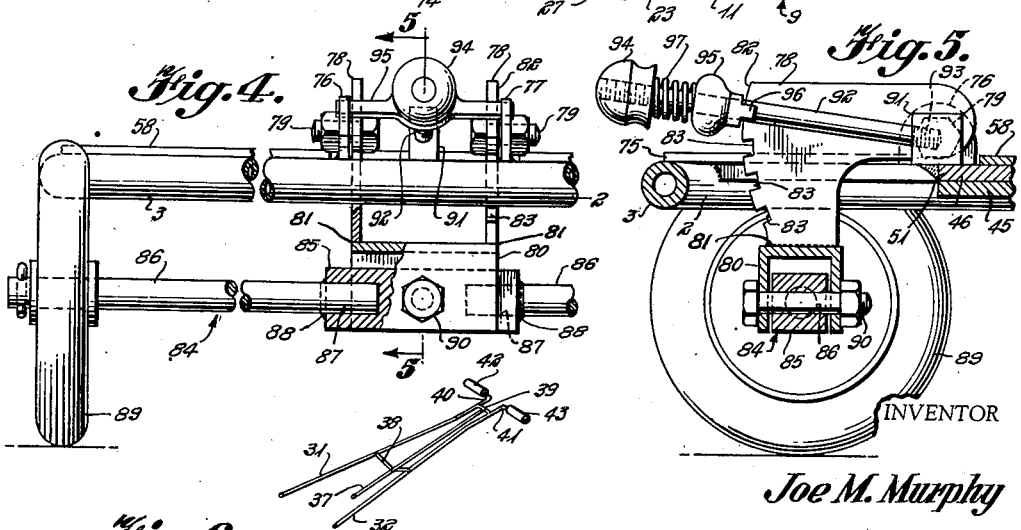
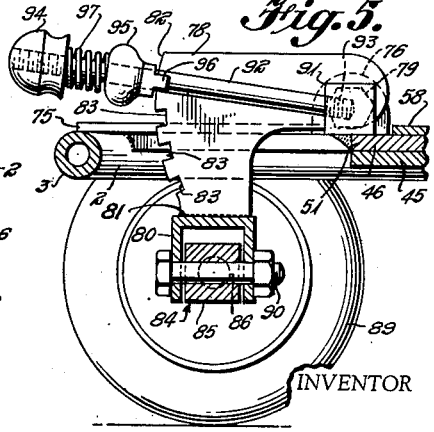
INVENTOR
Joe M. Murphy
BY Bacon & Thomas
ATTORNEYS

Patented June 8, 1954

2,680,339

UNITED STATES PATENT OFFICE 2,680,339

DISK TYPE LAWN MOWER WITH WHEEL ADJUSTMENT

Joe M. Murphy, Tulsa, Okla.

Application December 27, 1950, Serial No. 202,970

4 Claims. (Cl. 56—25.4)

The present invention relates to lawn mowers, and in particular to power driven lawn mowers in which it is desired to embody means for varying the level of the cutting blade with respect to the ground.

More specifically, the invention relates to a lawn mower embodying an adjustable, self-levelling front axle construction and mounting therefor, enabling the mower to cut the lawn at desired heights, and to readily conform to irregularities in the surface of the ground over which it is travelling without causing undesirable tipping of the mower or strain on the mower frame.

The principal object of the invention is to provide a front axle construction for a lawn mower together with adjustable mounting means for the axle which will enable the axle to be adjusted so that the cutting blade will rotate in a plane at a desired predetermined height above the ground and to selectively vary the height at which the grass will be cut.

Another object of the invention is to provide a lawn mower front axle and mounting means therefor which will automatically permit the axle to change its angular position relative to the frame of the mower to conform with variations in ground level without causing the mower to tilt or place any undue stress upon the mower frame.

Another object of the invention is to provide a rigid frame structure for a power driven lawn mower which can be readily fabricated by welding together pre-bent sections of tubing.

Other objects and features of the invention will be apparent from the following description taken in conjunction with the accompanying drawings, in which:

Fig. 1 is a side elevational view of a lawn mower embodying the principles of the present invention;

Fig. 2 is a plan view of the lawn mower shown in Fig. 1;

Fig. 3 is a vertical sectional view taken on the line 3—3 of Fig. 2;

Fig. 4 is an enlarged fragmentary front elevational view partly in section, and particularly illustrating the details of the front axle construction and the means for adjustably mounting the same on the front end of the mower frame;

Fig. 5 is an enlarged fragmentary sectional view taken on the line 5—5 of Figs. 2 and 4, and particularly illustrating the spring-pressed detent and toothed arms or segments of the axle mounting means for holding the front axle in adjusted position; and Fig. 6 is a perspective view, on a reduced scale, of the lawn mower handle.

Referring to the drawings, and more particularly to Figs. 1, 2 and 3, the lawn mower comprises a tubular frame generally identified by the numeral 1, made from sections of ½" pipe bent to the desired shape and welded together. One piece or front section of pipe 2 is bent to form a substantially semi-circular front portion 3 constituting the forward end of the frame and merging into side portions 5 and 6 extending rearwardly therefrom. The frame 1 may include, as a separate or integral part of the front frame section 2, a first rear section 2ª which lies in the same horizontal plane as the front section 2. The rear section 2ª is generally U-shaped and comprises legs or sides 5ª and 6ª having outwardly diverging ends 5ᵇ and 6ᵇ, which merge with or form a continuation of the side portions 5 and 6, the opposite ends of the legs 5ª and 6ª being interconnected by a transverse member 7 disposed at right angles thereto. When the frame sections 2 and 2ª are formed from a single length of tubing, which is the preferred construction, the ends of the tubing are welded together, as indicated at 8.

A second rear frame section 9 comprises a piece of pipe bent into a general U-shape to form an outer frame member having bent sides or legs 10 and 11 interconnected at one end by a transverse member 12, the opposite ends of said legs being welded at 13 and 14 to the sides 5 and 6 of the front frame section 2. The forward portion of the sides 10 and 11 of the frame section 9 is inclined upwardly and rearwardly on an angle of about 15° to the horizontal and the rear portion of said sides is inclined upwardly and rearwardly on an angle of about 30° to the horizontal, as indicated in Fig. 1. The frame side portions 5ª and 10 are disposed substantially parallel to each other, as viewed in Fig. 2, although they are not in the same horizontal plane as is evident from Fig. 3. However, the sides 5ª and 10 are rigidly interconnected by an inverted U or upright arch-shaped section of pipe 15 having legs 16 and 17 of different length with the ends of the legs welded to the frame portions 5ª and 10, as indicated at 19 and 20, respectively, in Fig. 3. The side frame portions 6ª and 11 are similarly related and are interconnected by a similarly shaped section of pipe 21, which has its legs welded at 22 to the portion 6ª and at 23 to the portion 11. Lugs 24 are welded to the front side of both of the legs 16 and 17 of the arch-shaped pipe section 15 and are suitably apertured to receive a bolt 25, which serves as an axle for a rear wheel 26 which, in one operative example of the invention, has an outside diameter of 20". Similar lugs 27 are welded to the arch-shaped pipe section 21 and support a bolt 28 which serves as an axle for another rear wheel 29.

A pair of lugs 30 is welded to the rear portion 12 of the pipe section 7 and the ends of handle elements 31 and 32 are secured to said lugs by wing bolts 33. Two bars 34 each have one end thereof welded to the rear frame portion 12 and extend downwardly and rearwardly in a plane at substantially right angles to the inclined plane of the sides 10 and 11. The bars 34 have a series of openings 35 formed therein to receive a bolt 36 for adjustably securing one end of a handle element 37 thereto. As best shown in Fig. 6, the handle element 37 is disposed medially and angularly to the handle elements 31 and 32 and is secured to the handle elements 31 and 32 by means of transversely extending pipe members 38 and 39 welded in place. The ends of the handle elements 31 and 32 remote from the wing bolts 33 are bent outwardly with respect to each other, as indicated at 40 and 41, to provide hand grip portions 42 and 43.

The front end 3 of the frame 1 is braced by diagonally disposed flat iron crossed members 45 and 46 to provide a very rigid frame structure. One end of the cross member 45 is welded at 47 to the flared leg portion 5b, and its opposite end is welded at 48 to the frame portion 3. The cross member 46 has one end thereof welded to the diverging frame portion 6b at 49 and its opposite end welded to the frame portion 3 at 50. The crossed members 45 and 46 are also preferably welded to each other at the region where they overlap, as indicated at 51. The frame 1 is further braced by parallel, transversely extending flat iron bars 52, which are welded at 53 to the frame portion 5a and at 54 to the frame portion 6a. The bars 52 provide a support for a ¾" plywood motor base 55 which is secured by bolts 56 to said bars. A conventional gasoline engine 57 is suitably mounted upon the base 55 and serves as a power source for driving the cutting blade, which will be described later. However, it will be understood that an electric motor may be mounted on the base 55 in lieu of the engine 57.

A shield 58 of heavy gauge sheet iron, shaped to the contour of the front of the frame 1, has one edge thereof disposed adjacent the base 55 and overlies the crossed members 45 and 46 and the frame portion 3. The shield 58 may be secured to the frame 1 by tack-welding along the periphery of said shield at desired points, as indicated at 59. A mandrel 60 is bolted or otherwise suitably mounted upon the shield 58 and rotatably supports a vertical shaft 61. The axis of the shaft 61 coincides substantially with the center of the radius defining the curved frame portion 3. A two-bladed cutter 62 is secured to the lower end of the shaft 61 and a pulley 63 is fixed to the upper end of said shaft. A jack shaft 64 is rotatably mounted in bearings 65 suitably secured to the base 55. A pulley 66 is secured to the shaft 64 and is drivingly interconnected with the pulley 63 by a crossed belt 67. A second pulley 68 is fixed to the shaft 64 and is driven by a belt 69 through a pulley 70 secured to an engine shaft 71. The pulleys 70, 68, 66 and 63 are suitably proportioned to provide an increased speed drive from the engine 57 to the cutting blade 62.

The shield 58 has an opening 75 formed therein in the region thereof which overlies the area of overlap of the crossed braces 45 and 46. A lug 76 is welded to the member 46 and a similar lug 77 is welded to the member 45, with both lugs extending upwardly through the openings 75 in the shield 58. Arms or segments 78 are respectively pivotally connected to the lugs 76 and 77 by bolts 79 for rotation about a horizontal axis transverse to the frame 1. The arms 78 are generally angular-shaped as viewed in side elevation, Fig. 5, and are respectively welded at their lower edges to a channel-shaped member 80, as indicated at 81. The arms 78 each have an arcuate portion 82 remote from the bolts 79 provided with a plurality of radially disposed notches 83 for a purpose which will be explained hereinafter.

The lawn mower includes a front axle which is generally identified by the numeral 84 and consists of an elongated central block portion 85, which is substantially square in transverse cross-section, and provided with longitudinally extending bores 87 at its opposite ends to receive similar rods or shaft sections 86, each of which has one end thereof mounted in a bore 87. The shaft sections are permanently welded to the block member, as indicated at 88. Front wheels 89 which, in one operative example of the invention, have an outside diameter of 6⅜", are suitably mounted for free rotation on the shaft sections 86 at the outer extremities thereof and in a region clear of the frame portion 3, as best illustrated in Fig. 2. The axle 84 is pivotally connected to the U-shaped or channel member 80 for swivelling or rotation about a horizontal axis, at right angles to the axis of rotation of the segments or arms 78, by means of a bolt 90 which extends through suitable openings in the channel member 80 and in the block 85.

An anchor member 91 is welded to the crossed braces 45 and 46 of the frame 1 in a region intermediate the lugs 77. A rod 92 has one end thereof mounted in a threaded opening 93 in the anchor member 91 and extends rigidly therefrom in a plane extending radially through the axis of the bolts 79. A knob 94 is threadedly mounted on the opposite end of the rod 92. A detent 95 is slidably mounted upon the rod 92 and is of greater length than the distance between the two arms 78 so that a tooth 96 carried by the detent can simultaneously engage with one of the radial notches 83 in each of the arms 78. A strong compression spring 97 surrounds the rod 92 in a region between the detent 95 and the knob 94 and serves to maintain the tooth 96 engaged with any selected one of the notches 83.

It will be apparent from the foregoing that the detent 95 can be manually retracted and the front axle 84 and its mounting means adjusted up or down about the horizontal axis of the bolts 79 to vary the height of the blade 62 with respect to the surface of the ground, to thus vary the height at which the grass will be cut. The axle 84 can be locked in any desired position of adjustment by retracting and then releasing the detent 94 into engagement with any selected notch 83 in the arms 78. It will also be apparent that the front axle 84 is itself free to swivel relative to its mounting means and the frame 1 about another horizontal axis provided by the bolt 90, and which axis is normal or perpendicular to the axis of the bolts 79. The front axle 84 is thus pivotally mounted so that it will automatically swivel about the bolt 90 in accordance with irregularities in the surface of the ground over which the mower is operating and will readily follow the contour of the ground and serve as a self-levelling device for the mower without imposing any strain upon the frame 1 or producing any tendency for the mower to tip.

It will also be apparent from the foregoing that the handle of the mower is adjustable so that the height of the hand grip portions 42 and 43 above the ground can be varied to suit the convenience of the operator by shifting the point of connection of the handle element 37 either up or down from the position illustrated in Fig. 1, by shifting the point of connection of said handle element 37 to the bars 34 through the bolt 36.

It will be understood that changes may be made in the arrangement and in the details of construction of the parts of the mower disclosed herein without departing from the principles of the invention or the scope of the annexed claims.

I claim:

1. A lawn mower, comprising: a frame structure; a pair of spaced lugs secured to said frame structure; an axle support including a pair of spaced parallel arms; means pivotally connecting said arms to said lugs for rotation about a horizontal axis transverse to said frame structure, each of said arms having a series of radial notches formed in an edge thereof remote from said lugs; a rod disposed between said arms; means securing one end of said rod to said frame structure; a detent carried by said rod and engageable with the respective notches formed in said arms; spring means urging said detent into engagement with said arms; an axle; and means connecting said axle to said axle support for pivotal movement about a substantially horizontal axis disposed at right angles to the axis of said means which pivotally connects said arms to said lugs.

2. A lawn mower, comprising: a frame structure a front axle comprising an elongated block and a pair of rod members each having one end thereof fixed in said block and extending in axially aligned relation from the opposite ends of said block; an inverted U-shaped member disposed above said block and receiving said block between the legs thereof; means pivotally connecting said block to said U-shaped member for rotation about a horizontal axis transverse to the axis of said rod members; and means securing said U-shaped member to said frame structure.

3. A lawn mower, comprising: a frame structure; a lug secured to said frame structure; an axle support including an arm; means pivotally connecting said arm to said lug for rotation about a horizontal axis substantially transverse to said frame structure, said arm having a series of radial notches formed in an edge thereof remote from said lug; and means for adjusting the position of said axle support relative to said frame structure including a rod disposed adjacent said arm, means securing one end of said rod to said frame structure, a detent carried by said rod and engageable with the respective notches formed in said arm, and spring means carried by said rod urging said detent into engagement with a notch in said arm; an axle; and means connecting said axle to said axle support for pivotal movement about a substantially horizontal axis disposed at substantially right angles to the axis of said means which pivotally connects said arm to said lug.

4. A lawn mower, comprising: a frame structure; a front axle including an elongated block and a pair of shaft members each having one end thereof mounted in said block and extending in axially aligned relation from the opposite ends of said block; a member of inverted U-shape in cross-section disposed above said block and receiving said block between the legs thereof; means pivotally connecting said block to said U-shaped member for rotation about a horizontal axis transverse to the axis of said shaft members; a pair of spaced lugs secured to said frame structure; a pair of spaced parallel arms extending from the base of said U-shaped member; means pivotally connecting said arms to said lugs for pivotal movement about a horizontal axis substantially parallel with the axis of said front axle, each of said arms having a series of radial notches formed in an edge thereof remote from said lugs; a rod disposed between said arms; means securing one end of said rod to said frame structure; a detent carried by said rod and simultaneously engageable with one of the notches formed in each of said arms to maintain said arms in desired adjusted position relative to said frame; and spring means urging said detent into engagement with said arms.

References Cited in the file of this patent

UNITED STATES PATENTS

| Number | Name | Date |
|---|---|---|
| 1,870,932 | Sternemann | Aug. 9, 1932 |
| 2,032,657 | Frederickson | Mar. 3, 1936 |
| 2,107,384 | McQueen | Feb. 8, 1938 |
| 2,167,222 | Shelor | July 25, 1939 |
| 2,263,368 | Sejkora | Nov. 18, 1941 |
| 2,308,076 | Hainke | Jan. 12, 1943 |
| 2,420,088 | Milburn | May 6, 1947 |
| 2,496,982 | Brukholder | Feb. 7, 1950 |
| 2,504,259 | Ford | Apr. 18, 1950 |
| 2,505,377 | Barker et al. | Apr. 25, 1950 |
| 2,515,573 | Soenksen | July 18, 1950 |
| 2,527,974 | Tostenrud et al. | Oct. 31, 1950 |
| 2,535,457 | Roberts | Dec. 26, 1950 |